United States Patent [19]

Klueber

[11] Patent Number: 4,508,180

[45] Date of Patent: Apr. 2, 1985

[54] CYLINDRICAL GUIDE MEMBER FOR AN IMPACTING MECHANISM IN A HAMMER DRILL

[75] Inventor: Wilhelm Klueber, Königsbrunn, Fed. Rep. of Germany

[73] Assignee: Hilti Aktiengesellschaft, Schaan, Liechtenstein

[21] Appl. No.: 407,730

[22] Filed: Aug. 13, 1982

[30] Foreign Application Priority Data

Aug. 17, 1981 [DE] Fed. Rep. of Germany ....... 3132450

[51] Int. Cl.³ .............................................. B25D 9/04
[52] U.S. Cl. .................................. 173/104; 173/116; 279/56; 279/64
[58] Field of Search ............... 173/104, 116, 133, 128; 279/56, 64

[56] References Cited

U.S. PATENT DOCUMENTS

| 2,678,827 | 5/1954 | Cawi | 279/56 |
| 2,910,302 | 10/1959 | Ondeck | 279/56 |
| 3,767,217 | 10/1973 | Jensen | 279/56 |
| 4,064,949 | 12/1977 | Chromy | 173/116 |
| 4,266,789 | 5/1981 | Wahl et al. | 279/64 |
| 4,275,893 | 6/1981 | Bilanceri | 279/64 |

FOREIGN PATENT DOCUMENTS

| 357959 | 8/1980 | Austria . |
| 2335865 | 1/1975 | Fed. Rep. of Germany . |
| 2740202 | 9/1977 | Fed. Rep. of Germany . |
| 2927185 | 5/1979 | Fed. Rep. of Germany . |
| 2948040 | 11/1979 | Fed. Rep. of Germany . |
| 988113 | 4/1951 | France . |
| 2276902 | 6/1975 | France . |
| 1505907 | 4/1978 | United Kingdom . |

Primary Examiner—Donald R. Schran
Assistant Examiner—James Wolfe
Attorney, Agent, or Firm—Toren, McGeady and Stanger

[57] ABSTRACT

A hammer drill includes a tubular guide member for transmitting rotational movement to a tool and an anvil axially displaceably supported in the tubular guide member for imparting impacting force to the tool. An impacting mechanism within a cylindrical guide member is aligned with a tubular guide member for transmitting impacting force to the anvil. A tool holder is mounted on the front part of the tubular guide member and has a radially adjustable tool holding zone. The radial adjustment is effected by radially displaceable jaws cooperating with the conically shaped section of the tool holder. When the shank of a tool is inserted into the holder, by axially adjusting the conically shaped section, the jaws can be displaced inwardly into holding contact with the tool shank. For improved concentricity, the cylindrical guide member and the tubular guide member are formed as an axially extending unit.

7 Claims, 4 Drawing Figures

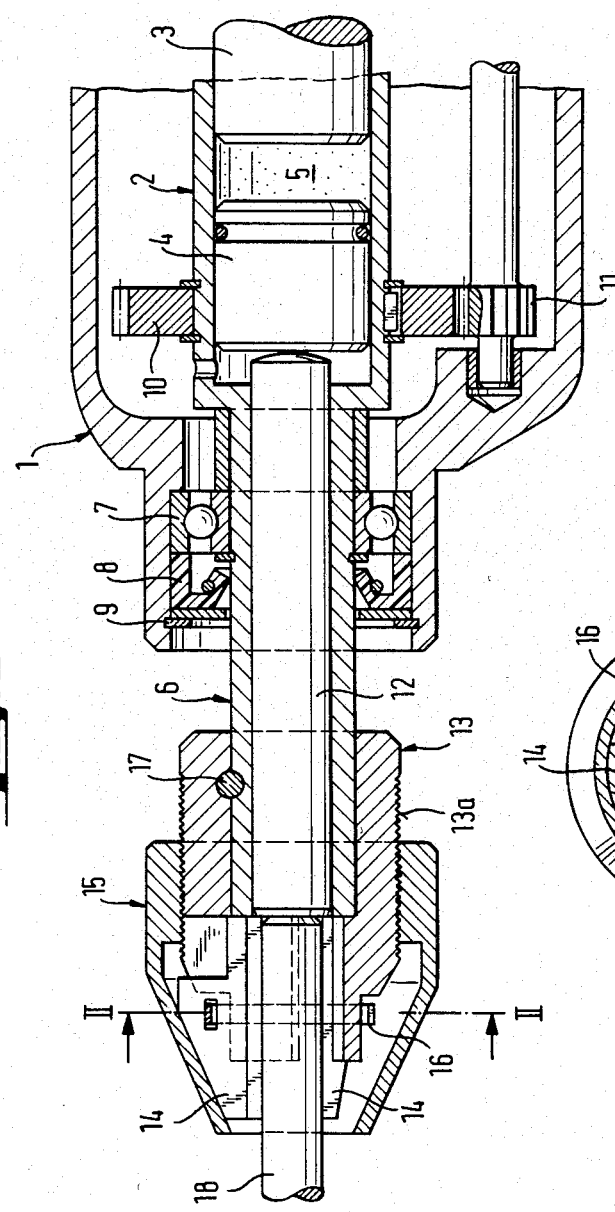
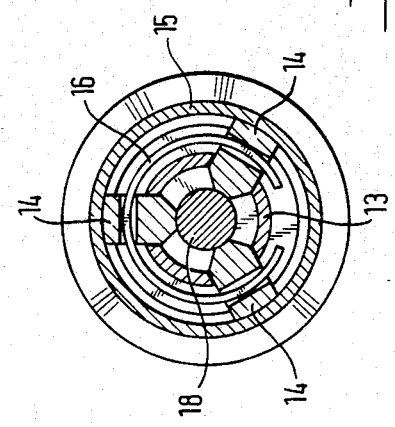

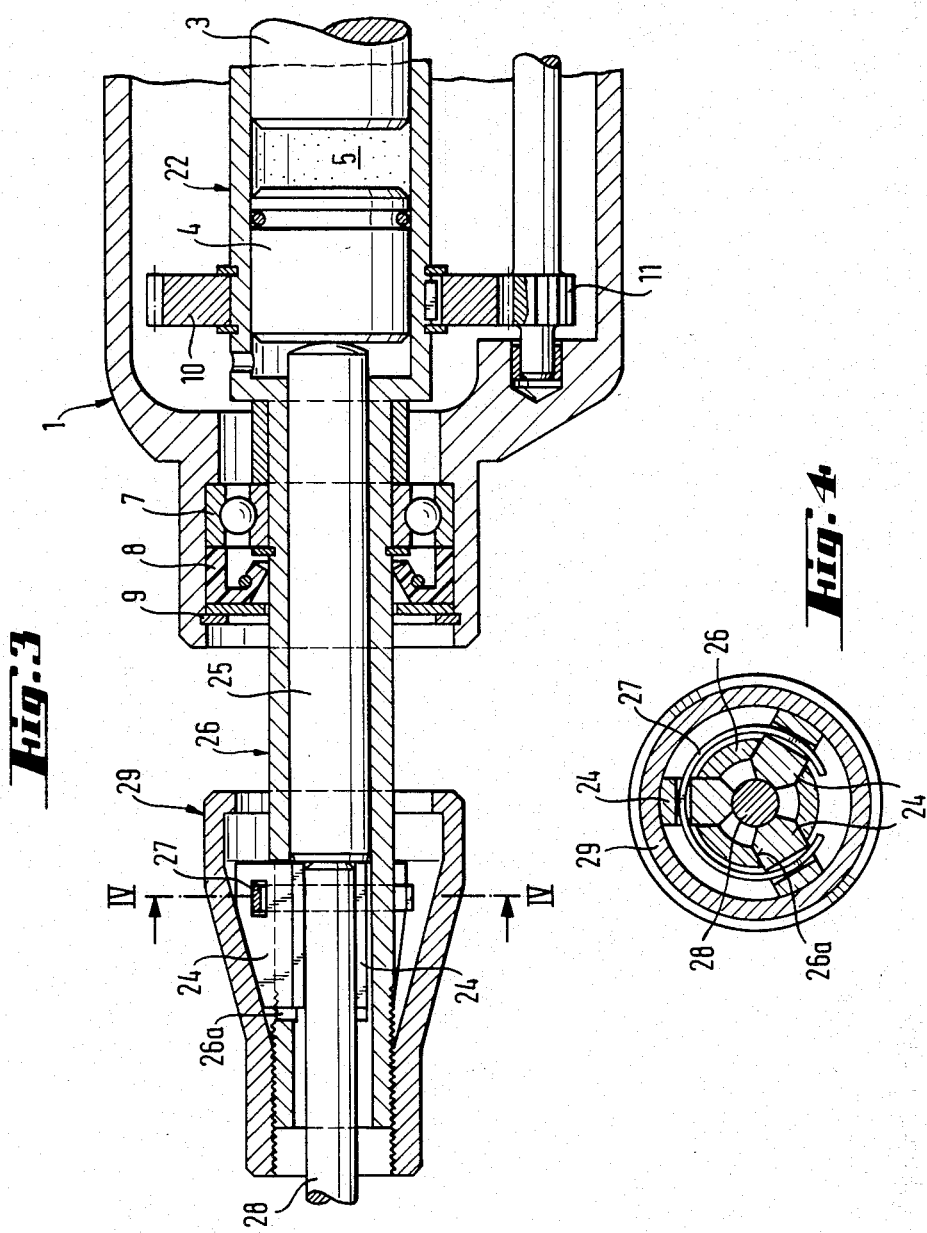

CYLINDRICAL GUIDE MEMBER FOR AN IMPACTING MECHANISM IN A HAMMER DRILL

SUMMARY OF THE INVENTION

The present invention is directed to a hammer drill with a cylindrical guide member for an impacting mechanism and a tubular guide member for mounting a tool holder and for transmitting rotational movement to a tool secured in the tool holder. An anvil for transmitting the percussion or impacting force to the tool is supported in the tubular guide member so that it is axially moveable relative to the tubular guide member.

Hammer drills, that is, drilling devices in which both a rotational movement and an impacting movement are transmitted to a drilling tool, are in widespread use at the present time, particularly in the construction and installation trades. Because of its advantages, such as, high drilling capacity and low application pressure, pneumatic operation has been adopted for the impacting mechanism. Such operation involves the use of a reciprocally driven exciter piston, actuated by an electrical drive, with the reciprocating movement transmitted over an air cushion to a freely moveable free-piston. The exciter piston and the free-piston can be aligned within a common cylindrical guide member. Furthermore, it is known to form the exciter piston according to the so-called plunger principle as guide for the free-piston. In the known arrangement, the exciter piston and free-piston are arranged one within the other in a telescopic manner and are supported in a cylindrical guide member. Such an arrangement affords a shorter axial construction. The cylindrical guide member can be rotatable or stationary. When a stationary cylindrical guide member is used, the rotational movement is transmitted via a pinion shaft to the tubular guide member.

In known devices, the transmission of rotational and impacting movement to the tool is effected by an intermediate shaft. For axial movement, the intermediate shaft is supported with radial play of a significant amount which is enlarged in the course of time because of the combined movements due to wear occurring during operation. Because of this radial play, the concentricity of the intermediate shaft and the tool is not sufficiently assured for certain special drilling operations, such as, spot drilling.

In another known hammer drill, separate elements are utilized for transmitting the rotational and impacting forces. In such devices, a hollow intermediate shaft forms a tubular guide member which is stationary in the axial direction during operation and an anvil is supported in the member so that it is axially displaceable. Since the tubular guide member primarily carries out rotational movement, radial play can be eliminated to a great extent by providing an exact fit. In this known hammer drill, however, the tool holder mounted on the tubular guide member has a certain receiving diameter. Accordingly, only such tools having a corresponding diameter can be used in the tool holder. When the receiving diameter of the tool holder has been subjected to considerable wear through the insertion and removal of tools, considerable radial play can develop so that the concentric operation of the tool is not adequately assured for certain drilling operations.

For drilling devices in which the impacting force can be switched off so that the drilling operation is carried out without any impacting effect, the above-described construction has certain disadvantages. In tools employed in drilling without any impacting stroke, the diameter of the shank end of the tool inserted into the tool holder corresponds to the drill diameter. To insert such tools into a hammer drill, up to the present time, it has only been known to insert a drill chuck with an adjustable receiving diameter into the tool holder. Since radial play cannot be avoided in the placement of the drill chuck into the tool holder, the radial play increases in the course of time because of the wear which occurs, as mentioned above, and an adequate concentricity of the tool cannot be assured.

Therefore, the primary object of the present invention is to provide a hammer drill of the type mentioned above which affords the optimum concentricity of the tool.

In accordance with the present invention, the tool holder is provided with a radially adjustable guiding region or zone.

By virtue of the adjustability afforded in the guiding region of the tool holder, it is possible to insure that the inserted shank end of the tool is always properly aligned. This feature can be provided for a certain diameter range of tools if the inserted shank end always has the same diameter. It is also possible, however, to provide the desired adjustment feature where different diameter shank ends of tools can be received and secured within the tool holder. Furthermore, any dimensional differences in the inserted shank end, because of manufacturing tolerances or wear, can be compensated with the continuous adjustability afforded by the present invention.

The radially adjustable guide zone can be formed in various ways depending on the conditions experienced. In its simplest form, the adjustable region or zone can be formed as a kind of collet chuck, that is, as a partially longitudinally slit bushing. The adjustable range of such a construction is quite small. For a universal adjustability, it is advantageous to form the guide zone using radially adjustable clamping jaws. Two, three, four or more clamping jaws, uniformly spaced about the circumference of the tool shank, can be used. Based on the principle of a stable three-point support, known per se, three clamping jaws can be provided for centering the tool. Accordingly, it is possible to use not only tools with a circular cross-section but also tools with a polygonal cross-section, such as, hexagonal, for the shank end to be inserted into the tool holder. By means of the radially adjustable clamping jaws, such tools can be centered and tightened in a force-locking manner. Accordingly, tools of practically any cross-sectional shape can be secured within the adjustable zone of the tool holder.

For providing radial adjustment of the clamping jaws, it is preferable to support the outer surfaces of the jaws on an axially displaceable frustoconically shaped sleeve. By axially displacing the frustoconically shaped sleeve, all of the clamping jaws in contact with it are radially displaced at the same time, either inwardly or outwardly, depending on the direction of movement of the sleeve. As a result, the clamping jaws always grip the shank end of the tools in the same axial region adjacent the end of the tool contacted by the anvil which transmits the impacting force.

When the anvil strikes against the rearward end of the tool shank, the tool is accelerated in the drilling direction. If the tool is not held in a firm manner by the clamping jaws, the tool may be pushed out of the region of the clamping jaws. To avoid such a possibility, it is preferable if the clamping jaws are acted upon by the forward end of the impacting anvil, that is, the end facing in the drilling direction. Accordingly, both the clamping jaws and the rear end of the tool are acted upon at the same time by the anvil. When the clamping jaws move forwardly in the drilling direction, since they are supported by the inside surface of the frustoconical sleeve, they are forced inwardly in the radial direction against the shank end of the tool. Therefore, an additional tightening effect is achieved when the anvil also strikes the clamping jaws. The stronger the striking action against the clamping jaws, the more the tool is tightened.

The clamping jaws can be arranged in the radially adjustable guide region of the tool holder in a number of different ways relative to the tubular guide member. In one possible arrangement, the clamping jaws are connected to the tubular guide member so that they project axially from the guide member in the drilling direction. Such an arrangement of the clamping jaws affords certain technical advantages with respect to production and maintenance. To provide a more compact arrangement of the clamping jaws, they can be positioned extending radially through the tubular guide member. In each of these embodiments, the adjustment of the clamping jaws is advantageously produced by the axially displaceable frustoconical sleeve already described. In the first embodiment mentioned above, the frustoconical sleeve projects axially from the tubular guide member, while in the second embodiment, the sleeve radially surrounds the tubular guide member.

In accordance with the characteristic features of the present invention mentioned above, it is possible to insert various diameter shank ends of tools into a hammer drill. Since the tool holder can be mounted on or at least partially integrated with the tubular guiding member through a suitable construction arrangement, an adequate concentricity of the tool holder can be assured. Due to the adjustable clamping jaws, the tool is tightened within the tool holder with the desired concentricity. An error in concentricity may occur if there is an excessive radial play in the tubular guide member. As mentioned previously, such excessive radial play can be decreased if only the rotational movement is provided via the tubular guiding member. To provide adequate concentricity of the tubular guide member, the correct arrangement of the tubular guide member support is a further feature of the present invention.

Therefore, in accordance with the present invention, the tubular guiding member and the cylindrical guiding member containing the impacting mechanism are formed as a unit. Such a one-piece construction has the result that deviations in concentricity between the tubular guide member and the cylindrical guide member arising from play related to manufacturing tolerances and the like can be avoided. Moreover, with a one-piece construction, there is the very substantial advantage that the bearings in the hammer drill housing can be spaced a considerable distance apart which affords favorable bearing loads. In addition, the one-piece arrangement facilitates the assembly of the tool holder.

By utilizing a one-piece construction of the tubular guide member and the cylindrical guide member, there is an improvement in concentricity in the hammer drill where the tool holder has the radially adjustable guide zone as mentioned above. The one-piece construction of the two guide members also provides a substantial improvement in the concentricity of drill hammers where, for technical reasons, no tool holder with a radially adjustable guide region is required.

The tubular guide member and the cylindrical guide member can have the same or different diameters. For space reasons, as well as for the formation of an axial supporting shoulder, it is advisable if the tubular guide member has a smaller outside diameter than the cylindrical guide member. To provide a compact construction of the drilling device and to provide optimum bearing conditions, the outside diameter of the cylindrical guide member is preferably 1.2 to 1.8 times the outside diameter of the tubular guide member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings

FIG. 1 is an axially extending cross-sectional view of a hammer drill embodying the present invention;

FIG. 2 is a cross-sectional view of the hammer drill taken along the line II—II in FIG. 1;

FIG. 3 is an axial cross-sectional view, similar to that shown in FIG. 1, however, illustrating another embodiment of the present invention ; and FIG. 4 is a cross-sectional view of the tool holder taken along the line IV—IV in FIG. 3.

DETAILED DESCRIPTION OF THE INVENTION

In FIGS. 1 and 3, the forward end of a hammer drill is illustrated, accordingly, as viewed in these figures, the left-hand end of the various parts is the front end and the right-hand end is the rear end. The hammer drill illustrated in FIGS. 1 and 2 includes an axially extending housing 1. The pneumatic impacting mechanism is located within housing 1. The pneumatic impacting mechanism is made up of a cylindrical guide member 2 containing a driven exciter piston 3 and a freely movable free-piston 4, positioned ahead of and spaced from the front end of the piston 3. An air cushion 5 is located between the front end of the exciter piston 3 and the rear end of the free-piston 4. The reciprocating movement of the exciter piston is transmitted to the free-piston 4 by the air cushion 5. Cylindrical guide member 2 is connected as a single member or unit with tubular guide member 6 with the tubular guide member having a smaller diameter than the cylindrical guide member. The cylindrical guide member 2 and the tubular guide member 6 are rotatably supported in the housing by a roller bearing 7. A shaft seal 8 at the front end of the housing 1 prevents the passage of dirt into the housing. The roller bearing 7 and the shaft seal 8 are axially secured in the housing by a securing ring 9. A gear wheel 10 is fixed to the forward portion of the cylindrical guide member 2. The gear wheel 10 is driven by a pinion 11 located within the housing 1.

An axially extending anvil 12 is axially slideably supported in the tubular guide member 6 and its rear end projects into the front end of the cylindrical guide member 2. At its front end, tubular guide member 6 supports a tool holder. The tool holder includes a chuck element 13, radially displaceable clamping jaws 14 and a frusto-conically shaped sleeve 15 laterally surrounding the clamping jaws and secured to a thread 13a on the outside surface of the chuck element 13. Clamping jaws 14 are biased radially outwardly against the inside frusto-conical surface of the sleeve 15 by an annular spring ring 16. A tangentially extending pin 17 secures the chuck element 13 to the tubular guide member 6 preventing any relative rotational or axial movement between these two parts. Clamping jaws 14 are displaced radially inwardly or outwardly by the axial displacement of the frusto-conical sleeve 15 relative to the chuck element 13 with the sleeve moving along the thread 13a. As a result, a radially adjustable guide zone is formed by the clamping jaws. The shank end 18 of a tool is inserted into the radially adjustable guide zone. The rear end of the tool shank 18 abuts the front end of the anvil 12. The reciprocating movement of the free-piston 4 is transmitted over the anvil 12 to the shank end 18 of the tool. Since the front end of the anvil 12 has a greater diameter than the rear end of the tool shank 18, accordingly, the front end of the anvil contacts both the clamping jaws 14 and the tool shank 18. When the anvil 12 strikes the clamping jaws 14, the jaws are displaced generally in the drilling direction and, as a result, are forced by the converging surfaces of the frustoconical sleeve 15 radially inwardly against the tool shank 18. Accordingly, the tool shank 18 is clamped more tightly and displacement of the tool shank out of the tool holder is prevented. Rotational movement is transmitted to the tool shank 18 via the cylindrical guide member 2, the tubular guide member 6 formed integrally with it, the chuck element 13 and the clamping jaws 14. The transmission of torque from the clamping jaws to the shank 18 of the tool is produced by the frictional or force-locking engagement of the jaws with the shank. The integral connection of the tubular guide member 6 with the cylindrical guide member 2 and their common support in the housing 1 along with the adjustable guide zone for the radially displaceable clamping jaws 14, afford an accurate centering of the shank 18 and thus a good concentricity of the tool. The separate transmission of the rotational forces and the impacting forces result in a small weight to be accelerated through the free-piston 4 and thus in a high stroke capacity.

As can be seen in FIG. 2, three clamping jaws 14 are provided in the tool holder. The use three clamping jaws affords accurate centering of the shank 18 of the tool. It would be possible, however, to use two, four or more clamping jaws.

The embodiment shown in FIGS. 3 and 4 with respect to the drive of the hammer tool corresponds to the embodiment illustrated in FIGS. 1 and 2. A tubular guide member 26 is integrally connected with a cylindrical guide member 22, both extending axially with the front end of the tubular guide member located in the region of the shank 28 of the tool. Clamping jaws 24 extend through pass-through openings 26a in the tubular guide member 26 so that the inner ends of the jaws can be located within the interior of the tubular guide member. An annular spring 27, note FIG. 4, biases the clamping jaws radially outwardly against the inside surface of the frusto-conical sleeve 29 which is screwed onto the front end of the tubular guide member 26 forwardly of the clamping jaws 24. By displacing the frusto-conical sleeve 29 in the axial direction relative to the tubular guide member, depending on the direction of such movement, the clamping jaws 24 are displaced radially inwardly or outwardly. As a result, the clamping jaws define a radially adjustable guide zone for the shank 28 of the tool. As can be seen in FIG. 3, the front end of the anvil 25 also acts or contacts both the rear ends of the clamping jaws 24 and of the shank 28 so that both the jaws and the shank are displaced axially within the tubular guide member 26. The additional clamping effect, described with respect to the embodiment illustrated in FIGS. 1 and 2, also takes place in the embodiment of FIGS. 3 and 4.

While specific embodiments of the invention have been shown and described in detail to illustrate the application of the inventive principles, it will be understood that the invention may be embodied otherwise without departing from such principles.

I claim:

1. Hammer drill comprising an axially extending cylindrical guide member having a front end and a rear end spaced apart in the axial direction, an impacting mechanism axially displaceable within said cylindrical guide member, a tubular guide member extending axially outwardly from the front end of said cylindrical guide member, a tool holder mounted on said tubular guide member and arranged to hold the shank of a tool and to impart rotational movement to the tool, an anvil axially movably displaceably located within said tubular guide member and having a rear end and a front end spaced apart in the axial direction with the rear end in engagement with said impacting mechanism for transmitting impacting force from said impacting mechanism via the front end to the tool held in the tool holder, wherein the improvement comprises that said tool holder includes means for securing the shank of the tool within said tool holder for securing the shanks of tools having a range of diameter dimensions, said means comprises a plurality of radially displaceable clamping jaws for holding the shank of the tool inserted into said tool holder, said jaws having radially outer surfaces and radially inner surfaces extending in the axial direction of said cylindrical guide member and radially extending rear ends located at the front end of said anvil, said tool holder includes an axially displaceable sleeve having a conically shaped surface in bearing contact with the radially outer surfaces of said clamping jaws so that axial displacement of said sleeve effects the radial displacement of said clamping jaws, the rear ends of said clamping jaws in position clamping a tool are located in the path of said anvil so that said clamping jaws extending inwardly into the path of the front end of said anvil are contacted by said anvil for displacement in the axial direction of said anvil under the impacting force of said impacting mechanism.

2. Hammer drill, as set forth in claim 1, wherein said clamping jaws project axially outwardly from said tubular guide member in the direction away from said cylindrical guide member.

3. Hammer drill, as set forth in claim 1, wherein said tubular guide member has openings therethrough extending in a radial direction and said clamping jaws are positioned in said openings so that said clamping jaws can move radially inwardly and outwardly through said openings.

4. Hammer drill, as set forth in claim 1, wherein said tubular guide member is formed integrally with said cylindrical guide member.

5. Hammer drill, as set forth in claim 4, wherein the outside diameter of said cylindrical guide member is in the range of 1.2 to 1.8 times the outside diameter of said tubular guide member.

6. Hammer drill, as set forth in claim 1, wherein spring means are disposed in engagement with said clamping jaws biasing said clamping jaws radially outwardly.

7. Hammer drill comprising an axially extending cylindrical guide member having a front end and a rear end spaced apart in the axial direction, an impacting mechanism axially displaceable within said cylindrical guide member, a tubular guide member extending axially outwardly from the front end of said cylindrical guide member, a tool holder mounted on said tubular guide member and arranged to hold a shank of a tool and to impart rotational movement to the tool, an anvil axially movably displaceably located within said tubular guide member and having a front end and a rear end spaced apart in the axial direction with the rear end in engagement with said impacting mechanism for transmitting impacting force from said impacting mechanism via the front end to the tool held in the tool holder, wherein the improvement comprises that said tool holder includes means for securing the shank of the tool within said tool holder for securing the shanks of tools having a range of diameter dimension, said means comprises a plurality of radially displaceable clamping jaws for holding the shank of the tool inserted into said tool holder, said jaws having radially outer surfaces and radially inner surfaces extending in the axial direction of said cylindrical guide member and radially extending rear ends located at the front end of said anvil, said tool includes an axially displaceable sleeve having a conically shaped surface in bearing contact with the radially outer surfaces of said clamping jaws so that axial displacement of said sleeve effects the radial displacement of said clamping jaws, said front end of said anvil having a diameter which contacts the tool held in said tool holder and extends radially outwardly therefrom sufficient to contact said jaws for axially displacing both the tool and said jaws, said cylindrical guide member formed integrally with said tubular guide member, and means for rotating said cylindrical guide member about the axis thereof so that said rotational movement is transmitted directly to said tubular guide member for rotating the tool held by said tool holder whereby the rotational movement of the tool and the impacting force are supplied separately.

* * * * *